United States Patent
Granfeldt et al.

(10) Patent No.: US 7,006,998 B2
(45) Date of Patent: Feb. 28, 2006

(54) PAYMENT SYSTEM

(75) Inventors: Björn Christian Granfeldt, Norrköping (SE); Tomas Martin Gösta Hägg, Norrköping (SE)

(73) Assignee: AB EFB, Energiforbattringar, Norroping (SE)

( * ) Notice: Subject to any disclaimer, the term of this patent is extended or adjusted under 35 U.S.C. 154(b) by 598 days.

(21) Appl. No.: 09/926,563

(22) PCT Filed: Mar. 17, 2001

(86) PCT No.: PCT/SE01/00562

§ 371 (c)(1),
(2), (4) Date: Nov. 19, 2001

(87) PCT Pub. No.: WO01/73698

PCT Pub. Date: Oct. 4, 2001

(65) Prior Publication Data

US 2002/0138444 A1    Sep. 26, 2002

(30) Foreign Application Priority Data

Mar. 19, 2000 (SE) .................................. 0000911

(51) Int. Cl.
G06F 17/60 (2006.01)

(52) U.S. Cl. .......................................... 705/65; 705/1
(58) Field of Classification Search .................. 705/1, 705/56, 65, 35.36; 380/297; 702/61, 62
See application file for complete search history.

(56) References Cited

U.S. PATENT DOCUMENTS 4,701,601 A   10/1987 Francini et al. ............. 235/449
5,450,051 A *  9/1995 Stromberg ................. 235/384

(Continued)

FOREIGN PATENT DOCUMENTS

JP         2004342075      * 12/2004

OTHER PUBLICATIONS

Bulk Encryption Crypto Processor for smat cards: Design and implementation, N. Sklavos et al.*

*Primary Examiner*—James P. Trammell
*Assistant Examiner*—John M. Winter
(74) *Attorney, Agent, or Firm*—Jacobson Holman PLLC (57) ABSTRACT

The invention relates to a payment system utilizing so called "smart cards", which include a microprocessor attached to the card with associated memory circuits for storage of transactions, and which via a terminal can be supplied an available and for the card holder useable amount. According to the invention, a unique card number for said card, together with a PIN code chosen by the user and registered for the card, are transformed by means of the card microprocessor into a unique and preferably encoded user certificate for each individual card, which is used for verification of the authority of the user. Said card includes preferably stored information relating to a maximum level of amount to which the card can be used without stating PIN code, and information relating to the maximum number of such transactions that can be performed without the card communicating and transferring information of executed transactions to the bank holding the account or similar party, such transactions being registered and stored in the memory circuits of the card with a corresponding reduction of available amount. When the card is used in connection with terminals not communicating on-line with account holding bank or similar, transaction data are stored in the memory circuits of the card as well as in the payment terminal, with available amount being correspondingly reduced, and on insertion into a reading terminal directly connected to account holding bank or similar, transfer of in the card stored transaction data takes place for registration/checkup of booked transactions with said bank or similar.

3 Claims, 2 Drawing Sheets

U.S. PATENT DOCUMENTS

| | | | |
|---|---|---|---|
| 5,650,761 A * | 7/1997 | Gomm et al. | 235/381 |
| 5,793,027 A | 8/1998 | Baik | 235/380 |
| 6,012,637 A | 1/2000 | Hirokawa et al. | 235/380 |
| 6,434,238 B1 * | 8/2002 | Chaum et al. | 380/45 |
| 6,442,532 B1 * | 8/2002 | Kawan | 705/35 |
| 6,496,808 B1 * | 12/2002 | Aiello et al. | 705/67 |
| 6,732,922 B1 * | 5/2004 | Lindgren et al. | 235/381 |

* cited by examiner

PAYMENT SYSTEM

This is a nationalization of PCT/SE01/00562 filed Mar. 17, 2001 and published in English.

The present invention relates to a payment system, based on the use of so called "smart cards", i.e. cards of credit card type including a microprocessor and having certain memory capacity. The system according to the invention can also be integrated with other existing card payment systems, i.e. credit and pay cards having information stored in a magnetic strip, and also systems such as, for example, Mondex and CashCard.

Payment systems of the type credit or pay cards have been used commonly for a long period of time and result in the possibility to make purchases and other types of payments without cash. However, users of such cards can only to restricted extent perform transactions of a smaller dimension with such cards, e.g. payment of travel with public transport, purchases of newspapers and similar. Further problems are obviously that such cards can be falsified, and that cards lost or in any other way misplaced can be used by unauthorized parties. A further problem is that a card holder can be held responsible for charges related to unauthorized use until a lost card has been disqualified, and also that a new card can not be issued immediately when a card is lost. Trade via Internet also involves problems, since many users are extremely reluctant to state the card number and the period of validity in connection with such transactions, in view of the risk that given information will be obtained by an unauthorized party or in any other way misused. Shop owners and similar accepting these types of payments at present require special purpose terminals in order to obtain relatively high safety when establishing that the cards used for payment have not been closed, and that a possible maximum credit limit is not exceeded. In order to minimize the above problems, cards of the type CashCard have been proposed, i.e. cards with a microprocessor and associated memory which can be "loaded" with a desired amount, e.g. in a bank. However, these cards require a special purpose terminal in the shops or similar accepting this payment procedure, and loss of such a card also results in that stored and unused credits can not be recovered, i.e. loss of such a card is equivalent to loss of the same amount in bank notes. This type of card has therefore not become very successful as a means of payment, and they are also completely unsuitable for certain types of transactions, e.g. payments via Internet. Existing types of cards are also very desirable in connection with robbery and theft.

The object of the present invention is to disclose a payment system which substantially or completely overcomes the disadvantages related to previous systems of payment, i.e. the system according to the present invention results in completely safe payments for the buyer as well as the seller. Furthermore, the system according to the invention is also adapted for all existing types of transactions, e.g. purchase of low price services or goods, use as a ticket for local public transports, safe payments via Internet, and also many other types of transactions, as disclosed in the following description. A not unimportant advantage is also that the terminals utilized by the system according to the invention are easily adapted to the types of cards as used today, which means that existing card payment systems can be accepted integrated with the system according to the invention. Other card and system links can be created by OEM information on the cards, e.g. in order to use the pay card as an entrance access card, or a card for travel within local public transport, parallel with the normal function of the card.

In order to simplify the description, only banks are mentioned below as issuing the cards used according to the present invention, but this term is also intended to include other types of companies offering financial services.

The payment system according to the invention utilizes so called "smart cards", which include a microprocessor attached to the card with associated memory circuits for storage of transactions, and which via a terminal can be supplied an available and for the card holder useable amount, from which reduction can be made via a pay terminal when the card is used as a means of payment, and that a unique card number for said card, together with a PIN code registered for the card, are transformed by means of the card micro processor into a unique user certificate for each individual card, which is used for verification of the authority of the user, and is mainly characterised in that said card includes stored information relating to a maximum level of amount to which the card can be used without stating PIN code, and information relating to the maximum number of such transactions that can be performed without the card communicating and transferring information of executed transactions to the bank holding the account or similar party, such transactions being registered and stored in the memory circuits of the card with a corresponding reduction and storage of remaining available amount and remaining number of allowed executable transactions; that said card when used in connection with not directly communicating payment terminals performs storage of transaction data in the memory circuits of the card as well as in the payment terminal; and that said card, when inserted into a reading terminal having direct connection with the bank holding the account or similar party, performs transfer of stored transaction data in the card for registration/checking recorded transactions with said bank or similar, and that preferably also at the same time limit values for total number of transactions allowed without stating PIN code, as well as maximum total amount limit for such transactions, are updated/restored.

The payment system involves the additional advantage that insertion of a non-valid card in an on-line terminal, or a terminal not communicating on-line but having memory stored bar list information relating to blocked cards, results in transfer to the terminal of stored transaction information in the non-valid card, as well as available program software on the card, which completely or partly is stored in the terminal, or at a directly communicating terminal, is transferred via the terminal; that as a successively following step said information/program software as substantially as possible is erased from the card; and that said obtained information as soon as possible is transferred to the account holding bank or similar with information relating to the identity of the terminal and the time when the action was performed.

A non-restricting example of a payment system according to the invention, and a number of examples of modifications thereto, will be more fully described below with reference to the accompanying drawings, in which.

Figure 1:
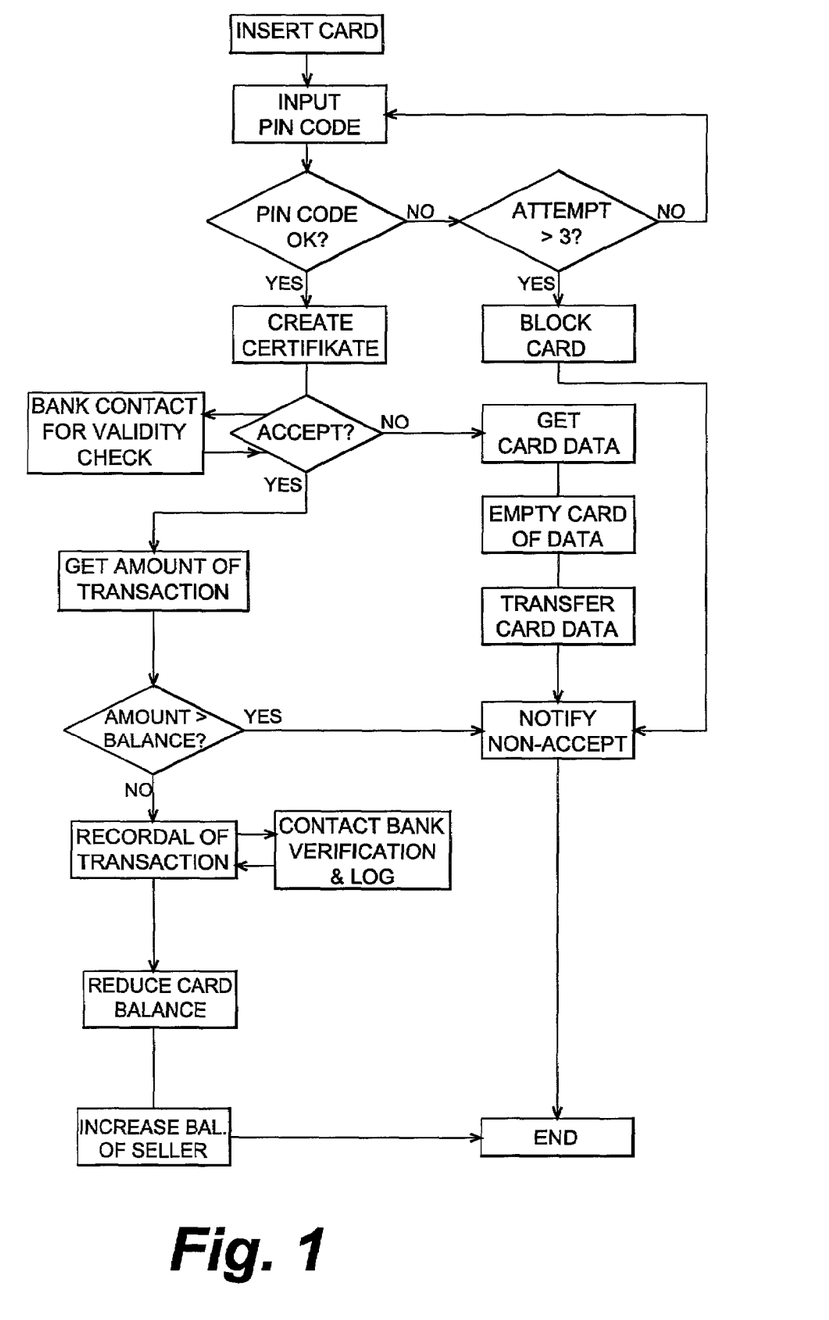
FIG. 1 is a block diagram schematically showing how a transaction is performed according to the present invention via a directly connected terminal, and also showing actions in connection with a non-accepted card.
Figure 2:
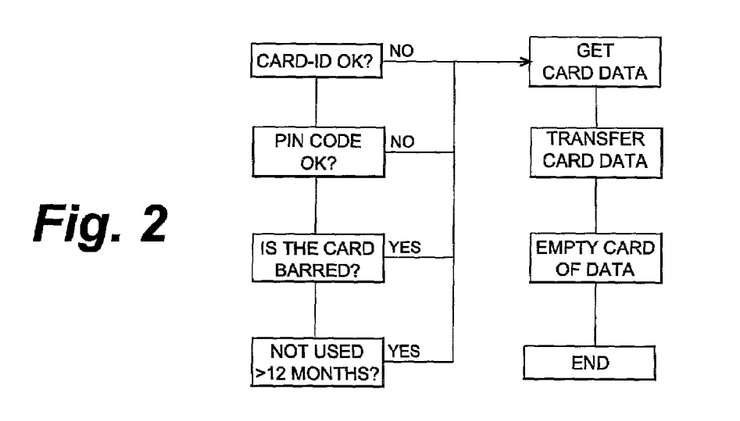
FIG. 2 is a block diagram which shows in more detail the check-ups performed for acceptance of a card (at "ACCEPT?" in FIG. 1)
Figure 3:
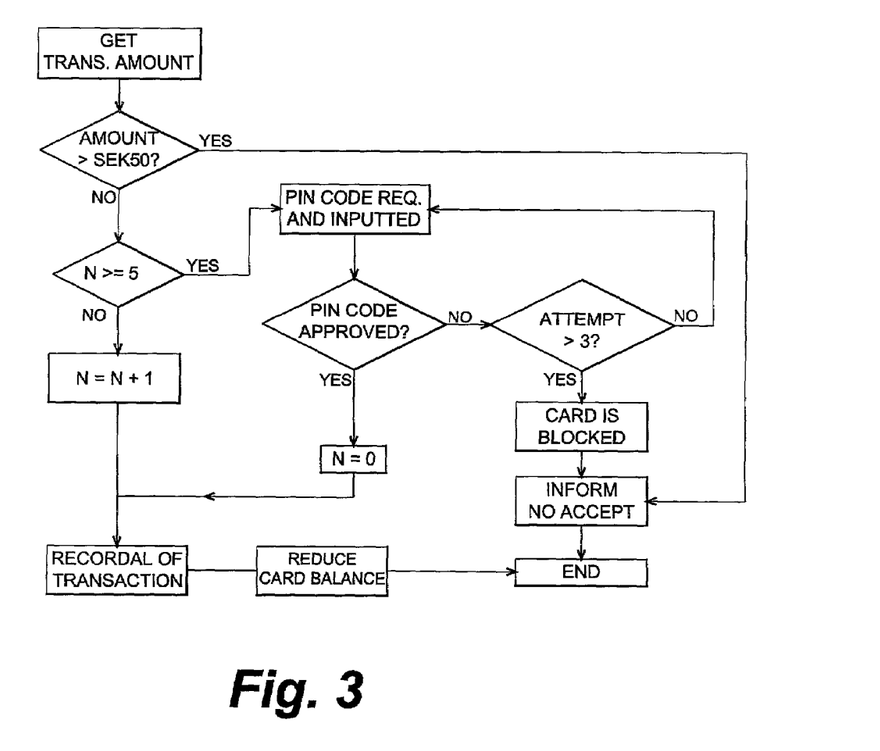
FIG. 3 is a block diagram which schematically shows a transaction of a value less than an amount (SEK 50) for which a PIN code is required, provided that the number of such transactions in the shown example does not exceed a predetermined number (N), which is shown as 5 transactions.

The payment system according to the present invention is substantially based on the use of cards having a processor and memory according to the ISO standard for smart cards. According to the invention, such cards may exist in a number of fashions having different software, adapted to intended field of use. However, said cards may primarily be divided into two main groups as follows.

Transfer Cards:

These cards can be used, for example, for transfer of amounts between a mobile and a stationary terminal. They may also serve as a substitute for a bankers cheque or similar means of payment. Furthermore, transfer cards require use of an associated PIN code, and may also be arranged locked to only function between specific terminals and/or accounts. They may also be used as a substitute for travellers cheques, and also serve as "emptying cards" for terminals intended for various types of machines, such as, for example, payment of parking fees, purchase of soft drinks and similar fields of use.

Pay Cards:

These cards are loaded with money from any terminal connected to the system directly from the bank account of a user. The amount is stored on the card as cryptical information and protected by PIN code. Furthermore, the software of the microprocessor is also read protected.

The card can be used for payments without activating a PIN code up to a predetermined and relatively low limit, e.g. SEK 50, and for payments exceeding the above limit by stating the PIN code. The number of successively following transactions without use of PIN code is registered, restricted to a predetermined maximum number, e.g. five, whereafter PIN code is required to complete the transaction. The above stated limited amount and number of transactions would result in that a lost card facilitates maximum use of SEK 250, whereafter the card is blocked for further use. The card is also blocked on repeated input of incorrect PIN code a predetermined number of times, e.g. after three incorrect attempts.

The cards may also contain an unlimited amount, but can also be arranged having a maximum upper limit, e.g. SEK 15.000, which is used as an example in the following description.

Said maximum upper limit, as well as the number of successively following withdrawals without PIN code, and also the maximum allowed limit for such withdrawals, can advantageously be modified by the user, preferably within certain predetermined levels.

Each single card has a unique identity, which is used for creating certificates, which form a base for payments made. Said certificates also facilitate that there is a central recordal of unused amounts for each card within the system, and that such unused amounts can be recovered in such a case that a card is lost or blocked against further use. In the latter case a unique certificate for the card is created at the time of blocking, which will credit the bank account of a user the available amount of the card, at the same time as the card is "emptied" of its content, i.e. same can no longer be used for payments.

A common feature of all cards is that, when blocked, they are locked against further use when the use of same is not accepted as valid by the bank, or the terminal used. The information collected during such an action is saved for examination, and this is a part of the safety system in order to, at an early stage, prevent attempted attacks on the system, and by analysis locate possible patterns in attempted attacks.

The blocking operation can be performed in a number of ways, whereof the following may serve as examples:

a) The card is stolen or lost. A manual blocking operation is performed on request by the user.
b) The card is damaged mechanically or in any other way. A manual blocking operation is performed by the user.
c) Incorrect use, e.g. a transaction card is used in an incorrect type of terminal or by use of incorrect PIN code.
d) The card has not been used within a certain predetermined period of time, e.g. one year.

With disregard to type of action, a card can be blocked by a report to the bank with information of the card number, or by a report via a shop terminal, requiring proof of identity and information relating to card number/PIN code. Furthermore, blocking can also be allowed by use of the shop code, combined with proof of identity for the owner, should same forget the PIN code of the card.

When blocking has been performed, the card is placed on a list of barred cards, and de-activated when placed in a terminal connected to the system. This involves erasing of software and stored data on the card, which data simultaneously (or later) are transferred to the issuing bank.

As previously mentioned, a card should preferably be used within a certain maximum period of time, e.g. one year, and otherwise be blocked against use. The object of such a feature is to prevent that the lists of blocked cards become infinitely long, e.g. filled with lost cards that no longer are being used. Money available on such cards can thereby automatically be transferred to a new card replacing existing card, which is blocked. Blocked and de-activated cards can obviously be reprogrammed by the bank and re-used.

The payment system according to the present invention includes a number of basic functions, which briefly can be stated as facilitating the following actions:

1) To make payments up to a predetermined limit (SEK 15.000) via a shop terminal, mobile terminal (SEK 50) or via Internet, when the recipient has terminal software for receipt of payments.
2) To make payments between cards, i.e. person-to-person payments.
3) To make transfers of money to desired bank or account.
4) To load the card from a personal computer or any terminal (however, not mobile).
5) To change PIN code via personal computer, bank or shop terminal.
6) To block a lost card via personal computer, bank or shop terminal.
7) To read existing available amount on the card from any terminal, including pocket readers (key ring readers), or to open the card for purchases without PIN code.
8) To facilitate a loading operation, the amount should exceed a certain minimum amount (e.g. SEK 100 or a corresponding amount in other currency), and that preferably a minimum amount corresponding to the transaction costs (an insurance premium for the transaction) should be available in order to accomplish a purchase.

The above mentioned functions facilitate that a user receives access to his money as "semi-cash", i.e. the card can be used to transform electronic money into bank notes and coins, or for payments. This also applies to known pay, credit and bank cards. The money stored on the card is protected from theft and the party receiving payment knows that when payment is received, the money is available as immediately obtainable cash.

The payment system according to the invention obviously also makes a user non-dependant on the opening hours of the banks, and a special feature is that payments via Internet can be made, without stating the card number. The risk taken by the banks with regard to card fraud is eliminated, as well as the problems that these can inflict on a card holder. Replacement cards replacing damaged or lost cards can be issued immediately, and with the same amount as was available at the time when the card was damaged or lost. Furthermore, replacement cards can be issued by any bank, a feature that is most desirable, e.g. when one is travelling.

The risk for robberies aimed at persons is also reduced, partly due to the fact that the card is protected by a PIN code, partly due to the fact that only a small amount can be obtained without PIN code (SEK 250). Credit balance of mislaid cards is also transferred to the account of the holder after a predetermined period of non-use (e.g. 1 year).

The payment system according to the invention includes a number of predefined and basic transaction types, which with regard to functions facilitate further additions to those defined below:

a) Payment between cards.
b) Payment to account.
c) Transfers from card to card.
d) Payment of goods/services via an online-terminal.
e) Payment of goods/services in an Internet shop.
f) Blocking of card.
g) Recovery of amount from lost/damaged card.
h) Transactions via mobile terminal.
i) Transfer between mobile terminal and bank.
j) Emptying of card.
k) Updating of card.
l) Change of PIN code.
m) Payment with bank or credit cards via the system.

Without regard to type of transaction, use utilizing a terminal directly connected to the bank involves a verification of the card and a checking operation of card data in relation to bank data. Any earlier transactions, which have not been communicated to the bank, e.g. any small amount transactions exist stored in the form of a transaction log in the card, are transferred to the bank for registration/bookkeeping before desired transaction is initiated.

The transaction log which exists due to the memory capacity of the card allows a user to perform an estimated number of 64 transactions offline, before used memory capacity has been exhausted. When approximately 10 further transactions are allowed before existing memory capacity has been completely exhausted, this fact is preferably shown in a display unit of the offline-terminals used, whereby the user is informed of the need to download stored data via a directly connected terminal. The user does not need to make any purchase in the directly connected terminal in order to transfer the log.

Even if a card during a long period of time is used only in offline-terminals, information relating to performed transactions will be transferred to the bank in connection with transfer of information to the bank from sellers of goods/services. Furthermore, for each transaction the amount available on the card is reduced by the transaction amount, which means that no purchase can be made for a larger amount than what is actually remaining.

The above mentioned transaction types (a–m) will now be briefly described.

a) Payment Between Two Cards

A payment (transfer) from one card to another is easily accomplished, and when using a terminal without direct connection to the bank, such a transaction can be performed as follows. Card No. 1 is placed in the terminal and amount and PIN code are stated. The amount is reserved as a withdrawal in card No. 1 and a certificate is issued, which is intermediately stored in the terminal. This is preferably time restricted to a valid period of, for example, 15 minutes. Thereafter card No. 2 is placed in the terminal, which accepts the certificate, whereafter a receipt is issued, which is stored in the terminal. Card No. 1 is placed once again in the terminal, receives the receipt, which is verified by card No. 1. Available balance for card No. 1 is reduced, the transaction is logged by the card and a withdrawal receipt is transferred to and stored by the terminal. As a final step, card No. 2 is once again placed in the terminal, whereby the amount in question is definitely transferred to card No. 2, which transaction log is updated with transferred amount and information relating to the transaction.

For the same type of transaction via Internet or at a directly connected terminal, the transfer can be carried out even more simply by placing card No. 1 in a reader, and by stating amount and PIN code. The card is verified by the bank and the amount in question is reserved as a permanent withdrawal, provided that card number of a recipient is received in a following step. Created certificate has once again a preferably time restricted period of validity, e.g. 15 minutes, and provided that card No. 2 is placed in the reader during this period of time with input of associated PIN code, the amount is transferred to card No. 2 and the transaction is registered as final and completed. In both of these two cases, the transaction is annulled should card No. 2 fail to be placed in the terminal within prescribed time period.

b) Payment to Account

The card is placed in the terminal and PIN code is inputted. Type of transaction is chosen, whereafter amount, clearing number of the bank and account number are stated. Transfer of the amount to selected account occurs immediately after that the card has been updated with the new information from the bank. Should the card holder interrupt input of the above information, the operation is terminated, and no change is made to the information stored within the card.

c) Transfer from Account to Card

This is accomplished substantially as described under b), i.e. the card is placed in the terminal with input of associated PIN code, type of transaction is stated and the amount requested to be transferred to the card. The account associated with the card is charged, and provided that desired amount is available, the card is updated with the new amount at the same time as the account is charged with transferred amount.

d) Payment of Goods/Services in an Online-terminal

The card is placed in the terminal with input of PIN code (if the amount exceeds the limit amount for transactions without PIN code, or if the number of such transactions has been reached), whereafter the amount in question is approved. As a result, available and stored amount in the card is reduced with the amount of the transaction.

Should purchases have been made via mobile terminals, such purchases being placed in the card log of transactions as well as the log of the mobile terminal, the card information of such stored transactions is transferred at the same time. It is of no importance from which party the information is transferred first to the bank, since the last reported logged information serves as a verification of the first received, whereby such a transaction is completely verified. However, received information from one party only is sufficient for a secure verification of a completed transaction, since the verification is carried out in a safe manner.

As well as with online-terminals as transactions via Internet, the information is updated immediately.

e) Payment of goods/services in an Internet shop

The card is placed in a reader connected to a computer, and the page of the site is chosen where payment should be made. As a first step, the software of the client is synchronized with the software of the shop, whereafter the client inputs the PIN code. Data from the client is sent coded (+128 bits) to the seller, who thereto adds the amount to be paid and its certificate. Contact with the bank is thereafter established from the seller, which checks the certificate of the seller, amount and client card data. Provided that received information is correct, the bank issues a "claim" with the amount in question calculated based on the currency of the card holder. This "claim" is sent via the seller to the client for verification of the stated amount (this amount is preferably stated in the currency concerned, and when required, also with rate of exchange). After verification from the client, the client contacts the bank for approval of the amount in question. This certificate from the client is now a "token" which is joined to the earlier "claim" from the bank for verification of correspondence with each other, whereafter a request for money is sent to the card. The amount is now reduced from present balance on the card and the balance information in the bank is updated correspondingly. A final certificate is sent to the seller, whereby the related amount is credited the seller, whereafter the transaction is completed.

All information mentioned above is preferably transferred strongly coded, which further secures complete safety for each transaction.

It is important, that the above described method of payment results in that the bank is immediately updated with regard to completed transactions, that the card is updated with used amount, that the seller receives verification approving the card, that the customer is allowed to accept the amount and to verify same, and that all parties involved receive verification of the allowed charge, and that money is available for the transaction.

f) Blocking of a Card

As previously mentioned, there might be reasons for blocking a card when it has been lost, damaged or stolen, and such an operation can be performed manually by the card holder or, under certain circumstances, automatically.

As examples of various ways to perform blocking manually can thus be mentioned via a directly connected terminal (by statement of card number and PIN code), by direct contact with the bank, or by identifying oneself in a shop and stating the bank to which the card is associated and/or PIN code. The shop may then, by means of a special program in its terminal for blocking operations, based on stated information perform a blocking operation for the card in question.

An automatic blocking operation is performed, as previously mentioned, when incorrect PIN code is stated repeatedly, as well as when a card has not been used during a specified period of time.

A blocking operation for a card does not involve any mechanical damage to the card, but merely that it is emptied of stored information and program software at the first attempt made to use a blocked card in an online-terminal, whereby stored information is transferred to the bank. The card is thereby erased from the list of barred or blocked cards. It is also within the scope of the invention to include a memory with such an updatable list of barred or blocked cards in mobile terminals, and at an attempt to use a blocked card store the information from the card in the mobile terminal, and thereby empty the card of stored information and program software.

In order to secure that a blocked card can not be used for a restricted number of smaller transactions, which do not require PIN code, a user may also choose that a card is issued for which PIN code is required for every single transaction.

With regard to mobile terminals, it may also be stipulated that transfer of data should be performed within a certain period of time, e.g. 7 days, in order to further increase the safety of the system. For terminals, e.g. in soft drink machines, involving small amounts and longer service intervals, longer periods of time can obviously be accepted.

g) Recovery of Amount from a Lost or Damaged Card

Should a user loose his card, the unused amount can, as already previously mentioned, be transferred to a new card. This can obviously also take place should a user's card be damaged in such a way that it can not be used. As soon as a card is blocked, the new card can be issued, which is linked to the account of the user. A certain amount of the registered balance may initially be reserved by the bank, serving as a guaranteed amount for non-registered transactions performed with the card which has been lost or damaged. After, for example, 2 weeks, reserved amount not used for such transactions can be transferred to the new card, an operation that can be performed automatically in connection with use of the new card with an online-connection to the bank. This means that a user can collect a new card on the same day as a lost card is blocked, with a possible excess for non-registered purchases charged during a short period of time, which becomes available within a relatively short period of time provided that no non-registered withdrawals exist for the old card.

h) Transactions via mobile terminal

A purchase via a mobile terminal involves certain restrictions in view of the fact that same does not facilitate the same checking system as online-terminals. These should therefore not allow purchases exceeding a predetermined level of amounts.

Mobile terminals can be used for e.g. soft drink machines, bus and taxi travel, admission to cinemas, car parking and other purposes involving relatively small amounts.

An example of an interesting field of use is, for example, the possibility to use a special version of cards within a town as a means of payment for bus travel within public transport. Such a card having, for example, a limited amount of SEK 10 and 25 such transfers, can be used as a simple system for payment of bus travel. In those cases where return travel or transfer to another bus line is allowed during, for example, one hour, stored data relating to performed payment may also include the actual time for first travel, whereby a new amount is not charged when entering another bus, provided that such a time limit has not been exceeded.

i) Transfer Between Mobile Terminal and Bank

As previously mentioned, mobile terminals should be emptied of information at regular time intervals, an action related safety for the customer as well as accounting within the bank. With regard to mobile systems used e.g. for purchase of tickets on public transport, an emptying operation should preferably be performed on a daily basis, in view of the large number of transactions that may occur.

Transfer can be accomplished by means of a terminal, or by use of a transfer card, which transfers logged information together with total amount.

In order to obtain maximum security, this information is transferred coded in order to avoid risk for any form of illegal influence. Should the digital signature not be correct, logged information is not accepted, whereby payment is not made to the account in question. Hereby protection is obtained against unauthorized equipment.

Used equipment for emptying mobile terminals shall of course be in direct contact with the bank to facilitate an emptying operation.

j) Emptying of Card

As already mentioned, a non-authorized or blocked card will be emptied of all information, to the extent possible, when such a card is brought into contact with directly connected equipment, or a mobile terminal having an updated list of blocked cards.

When this occurs, an emptying sequence is initiated, whereby data, and program software, are transferred, preferably coded, to the terminal/bank. The ID-number of the card is also transferred at the same time, and the blocked card can thereafter be removed from the list of blocked cards.

For unknown cards, a read routine is initiated by the terminal, arranged to attempt to read as much as possible of stored data and software. The data obtained are encoded and signed by the terminal in question, and transferred as an alarm disclosing that a manipulation or counterfeiting attempt is in progress.

When the read routines have been completed, the present card is emptied/reprogrammed by initiation of a sequence with "block erase" erasing both data and program software from the card. This on condition that the card is not identified as a valid card from an issuing authority not participating in the payment system.

Common for all deactivations is, that time, date and terminal number are logged and transferred together with data collected from the card. This facilitates a later analysis of data obtained, and thereby a possibility to develop protective means against possible attempts of attack aimed at the payment system.

k) Updating of Card

A card can be updated at any online-connected terminal when this is required. Such an update may, for example, relate to smaller changes of the program software of the card, or change of the entire program software to a new and updated version, as well as changes to the encoding key or a change from a primary encoding key to a secondary. Such an update should preferably always include a checking operation of present status for the card against the bank, and the bank information is thereafter added to the card, if such a need exists after the checking operation.

l) Change of PIN Code

Change of PIN code can only be performed via online-connected terminals, in view of the fact that the bank must be updated with the same information, since utilized encoding keys preferably are based on an algorithm which partly is based on present PIN code.

It is obviously in this connection an advantage, that a user freely can select a PIN code with a combination of numerals that the user easily can memorize, as well as that change of PIN code can be performed in a rapid and simple way whenever a user so desires.

m) Payment with Bank or Credit Cards via the System

Should a person not hold a card intended for the payment system according to the invention, but be the holder of a credit, pay or bank card with magnetic strip or a chip system based on the ISO standard, these types of cards can also be used in the system according to the invention.

For example, payments at distance, e.g. via Internet, involving a card with a magnetic strip, same is inserted into a therefor adapted reader, and stored information relating to card number and issuer are read. After input of PIN code by the user, the data obtained are transferred, preferably encoded, to the seller, which adds the requested amount to the information, whereafter all information is transferred to the bank and the customer.

The customer verifies the amount and establishes contact with the bank stated on the certificate from the seller, and the bank checks the information from the seller against the information from the customer. A receipt for the present payment is created by the bank, which directly from the bank, or via the customer, is transferred to the seller as evidence of completed payment.

The purchase is thereby made final, without any information given to the seller regarding the card number or risk for same being communicated to an unauthorized party. The seller can not change the amount, or make further withdrawals from the card, without the knowledge of the card holder.

By this method all present day risks relating to spreading of card number and associated information of validity term are removed. As a further development of this method, a seller may also create a system for recognizing customers by fetching the certificate associated with a certain customer, and which can be obtained from the bank. This could, for example, be accomplished by sending card number together with PIN code to the bank, which in response informs of the certificate number for the customer.

Such a certificate number only gives reference to a certain specific customer, and can not be used by a seller to create payments, since information relating to a payment must consequently be verified by the terminal of the buyer, since this traffic (verification) does not run through the system of the seller.

Furthermore, each payment receives an encoded serial number, which means that for each payment a unique one time certificate is created, which is issued by the bank. A seller can only read the information related to and required for the seller with regard to each individual transaction.

For direct payments, e.g. in a shop, stored data can be read and this can be transferred together with the amount of the purchase via online-connected terminals in a manner substantially corresponding to the terminals used today for this purpose.

The terminals utilized for the payment system according to the present invention have already been partly described with regard to functions, but examples of embodiments that can be used will hereinafter be briefly described.

1. Personal terminals, which comprise a relatively very simple card reader including a write function for connection to a personal computer via USB, serial port or as an internal system unit (e.g. connected similar to a floppy disk unit or a CDRW-unit). It is controlled via associated program software in the computer, preferably via a WEB-based interface, in which case the program code preferably is written in Java, or C/C++, and in the latter case as a plugin to the web reader. A completely self-contained program can obviously also be used. Any system-api should never in any case be supplied for the clients and the code should be closed.

2. Shop terminals, including a keypad with display unit, which, for example, may comprise of a simple LCD-display. The terminal is preferably arranged with a serial port or similar means of connection facilitating co-action with a cash register system, whereby information relating to the amount of a completed purchase can be sent to the terminal, and the cash register system can also register information from the terminal relating to transaction number for information on the receipt. The terminal is communicating via modem or any other method of connection (e.g. Ian-gan, ISDN, analogue) for direct verification of larger amounts, as well as (when sufficient memory capacity is available) for maintaining the blocking lists of the system. The protocol for communication between shop terminal/cash registersystem is assumed available according to an open standard in order to facilitate development of cash register systems adapted for use with the system. As previously mentioned, these terminals may advantageously include a card reader for conventional credit, pay and bank cards having a magnetic strip, as well as program software for handling other types of cards having a micro processor, e.g. CashCard, whereby only one terminal is sufficient for all types of presently existing systems for card payment. This can also be implemented in other types of terminals than shop terminals.

3. Bank terminals, having a basic concept similar to the above described personal terminal (1), but with further specially adapted program software facilitating the functions which are specific to banks.

4. Outdoor terminals having keypad and LCD-display, which facilitate performance of simple functions, such as loading the card with a new amount, card-to-card transactions, as well as blocking of cards (can be performed with knowledge of card number and PIN code).

5. Mobile terminals, which are a special type accepting smaller payments, since no possibility exist for direct connection to central systems. Performed transactions are stored in the mobile terminal, and can be emptied via transfer cards, terminal or via an existing serial port, USB-port or similar. Such terminals, as well as other types of terminals, may also via IR-connection, galvanical circuit electrical connection, or any other known method, be arranged to facilitate use of a mobile telephone system as means of communication. Hereby, e.g. occasional single payments of large amounts, may also be accepted and directly verified via a mobile terminal.

The above described examples of cards, functions and terminals are only intended to disclose basic and non-restricting examples of embodiments within the scope for the payment system according to the invention, and to disclose ways in which they can be implemented. It is thus believed to be within the knowledge of a person skilled in the art to create necessary program software to accomplish described functions, as well as to design the terminal described herein and which construction can be varied in a number of different ways utilizing techniques known within the field.

Any examples of suitable encoding algorithms have not been given, partly in view of the fact that knowledge of such algorithms should not be published, partly since examples of how a number of such algorithms are built up and work are previously known. In this connection it has only been stated, that same should preferably be of the type with at least 128 bits, and that the system should preferably include a primary and a secondary algorithm, and that utilized PIN code consists one of the elements for encoding.

The payment system according to the present invention is thus in no way restricted to the examples of embodiments herein described, which means that a payment system according to the invention may include less as well as more functions than what has been described, within the scope of the inventive thought and the following claims.

What is claimed is:

1. A payment system utilizing a card, which includes a microprocessor attached to the card with associated memory circuits for storage of program software and transactions, and which via a terminal can be supplied with an available and useable amount for a card user, from which reduction can be made via a payment terminal when the card is used as a means of payment, and that a unique card number for said card, together with a PIN code registered for the card, are transformed by means of the card microprocessor into a unique user certificate for each individual card, which is used for verification of the authority of the user, characterized in that said card includes stored information relating to a maximum level of amount to which the card can be used without stating PIN code, and information relating to the maximum number of such transactions that can be performed without the card communicating and transferring information of executed transactions to the bank holding the account or similar party, such transactions being registered and stored in the memory circuits of the card with a corresponding reduction and storage of remaining available amount and remaining number of allowed executable transactions; that said card when used in connection with payment terminals not communicating online performs storage of transaction data in the memory circuits of the card as well as in the payment terminal; that said card, when inserted into a reading terminal having direct connection to the bank holding the account or similar party, performs transfer of stored transaction data in the card for registration checking recorded transactions with said bank or similar party, and that preferably also at the same time limit values for total number of transactions allowed without stating PIN code, as well as maximum total amount limit for such transactions, are updated restored and the system further comprising the means for performing the following steps to facilitate transfer of an amount between two cards with use of a terminal included in the payment system, wherein: as an initial step, a first card is placed in a terminal with input of type of transaction, PIN code and intended amount; as a following step, verification is performed of the first card and PIN code, requested amount is reserved, and a time restricted certificate is created for the terminal used; the second and receiving card is placed in the terminal within a predetermined time period with input of the PIN code for the second card, whereby the amount in question is transferred and registered as a completed transaction; and should the second and receiving card not be placed in the terminal within said predetermined time period, the transaction is annulled as not completed.

2. A payment system utilizing a card, which includes a microprocessor attached to the card with associated memory circuits for storage of program software and transactions, and which via a terminal can be supplied with an available and useable amount for a card user, from which reduction can be made via a payment terminal when the card is used as a means of payment, and that a unique card number for said card, together with a PIN code registered for the card, are transformed by means of the card microprocessor into a unique user certificate for each individual card, which is used for verification of the authority of the user, characterized in that said card includes stored information relating to a maximum level of amount to which the card can be used without stating PiN code, and information relating to the maximum number of such transactions that can be performed without the card communicating and transferring information of executed transactions to the bank holding the account or similar party, such transactions being registered and stored in the memory circuits of the card with a corresponding reduction and storage of remaining available amount and remaining number of allowed executable transactions; that said card when used in connection with payment terminals not communicating online performs storage of transaction data in the memory circuits of the card as well as in the payment terminal; that said card, when inserted into a reading terminal having direct connection to the bank holding the account or similar party, performs transfer of stored transaction data in the card for registration checking recorded transactions with said bank or similar party, and that preferably also at the same time limit values for total number of transactions allowed without stating PIN code, as well as maximum total amount limit for such transactions, are updated restored and the system further comprising the means for performing the following steps to facilitate transfer of an amount between two cards with use of a terminal included in the payment system, wherein: the card is placed in a card reader connected to a computer with related program software; the program software used in a following step preferably is synchronized with the program software of a seller, with whom the computer is communicating; the PIN code of the card is stated, and based on card data and PIN code an encoded certificate identifying the holder of the card is transferred to the seller; the seller adds to received encoded certifeate information relating to the actual amount to be charged to the buyer, and transfers this information to the account holding bank or similar party; said account holding bank or similar party, after checking the authority of card holder and seller, issues a preliminary certificate (claim) relating to the transaction, which via the seller is transferred to the card holder; the card holder from said certificate receives information concerning at least the amount in question, and the card holder in order to finalize the purchase directly to the account holding bank or similar party transfers received preliminary certificate verified as approved (a token); and the account holding bank or similar party performs a checking operation relating to correspondence between earlier "claim" and received "token", and if correspondence is established on one hand reduces existing amount on the card, and on the other hand transfers a certificate to the seller, who is thereby credited the amount in question.

3. A payment system utilizing a card, which includes a microprocessor attached to the card with associated memory circuits for storage of program software and transactions, and which via a terminal can be supplied with an available and useable amount for a card user, from which reduction can be made via a payment terminal when the card is used as a means of payment, and that a unique card number for said card, together with a PIN code registered for the card, are transformed by means of the card microprocessor into a unique user certificate for each individual card, which is used for verification of the authority of the user, characterized in that said card includes stared information relating to a maximum level of amount to which the card can be used without stating PIN code, and information relating to the maximum number of such transactions that can be performed without the card communicating and transferring information of executed transactions to the bank holding the account or similar party, such transactions being registered and stored in the memory circuits of the card with a corresponding reduction and storage of remaining available amount and remaining number of allowed executable transactions; that said card when used in connection with payment terminals not communicating online performs storage of transaction data in the memory circuits of the card as well as in the payment terminal; that said card, when inserted into a reading terminal having direct connection to the bank holding the account or similar party, performs transfer of stored transaction data in the card for registration checking recorded transactions with said bank or similar party, and that preferably also at the same time limit values for total number of transactions allowed without stating PIN code, as well as maximum total amount limit for such transactions, are updated/restored; and the system further comprising the means for verification of the validity of a card to check if the card has not been used during a predetermined period of time, and at attempts to use such an unused card block and empty same of stared data and accessible program software.

* * * * *